United States Patent [19]

Parra et al.

[11] Patent Number: 4,835,474
[45] Date of Patent: May 30, 1989

[54] METHOD AND APPARATUS FOR DETECTING SUBSURFACE ANOMALIES

[75] Inventors: Jorge O. Parra; Thomas E. Owen, both of Helotes; Bob M. Duff, San Antonio, all of Tex.

[73] Assignee: Southwest Research Institute, San Antonio, Tex.

[21] Appl. No.: 933,871

[22] Filed: Nov. 24, 1986

[51] Int. Cl.⁴ .............................................. G01V 3/02
[52] U.S. Cl. .................................. 324/363; 324/357
[58] Field of Search ............... 324/347, 354, 357, 360, 324/363, 364, 358

[56] References Cited

U.S. PATENT DOCUMENTS

| | | | |
|---|---|---|---|
| 2,113,749 | 4/1938 | Statham | 324/360 |
| 3,849,722 | 11/1974 | Nilsson | 324/357 |
| 4,295,096 | 10/1981 | Sternberg et al. | 324/357 |
| 4,467,283 | 8/1984 | Owen et al. | 324/363 |

OTHER PUBLICATIONS

Darilek et al, "Focussed Resistivity Method for Detecting Sub-surface Coal Mine Workings", *Bureau of Mines, U.S. Dept. of Interior*, Mar. 1986, pp. 1-103.

Primary Examiner—Reinhard J. Eisenzopf
Assistant Examiner—Warren S. Edmonds
Attorney, Agent, or Firm—Matthews & Branscomb

[57] ABSTRACT

A method and apparatus for collecting measurements on the surface of the earth in a form which can be processed to obtain enhanced resolution of subsurface resistivity anomalies in the earth's geologic structure. The system of the preferred embodiment utilizes many separately acquired voltage and current measurements on the earth's surface in a superposition analysis to "synthesize" the condition whereby the many separate measurements are acquired simultaneously to give useful advantages in improved depth of investigation commonly known as focused resistivity measurements.

6 Claims, 5 Drawing Sheets

METHOD AND APPARATUS FOR DETECTING SUBSURFACE ANOMALIES

This invention was conceived under United States Government Contract No. H0245005. The United States Government has a nonexclusive, nontransferable, irrevocable, paid-up license to practice or have practice for or on behalf of the United States this invention throughout the world.

FIELD OF THE INVENTION

The present invention relates generally to the field of geophysical measurements. More specifically, the present invention provides an improved system for the detection and mapping of underground cavities through the use of high-resolution, time-sequenced measurements of earth resistivity using a pole-dipole array. These measurements can be converted to a synthetically-derived resistivity measurement which enhances cavity target detection and reduces the effects of near-surface geologic noise.

BACKGROUND

The detection and mapping of underground cavities is important in mining and geotechnical engineering where load-bearing strength of foundations and potential problems of ground stability and subsidence are of concern. Several geophysical methods have been used in the past for these applications, including gravity and gravity gradient measurements, scalar earth resistivity (DC and low-frequency AC) measurement, audio frequency induction and magnetotelluric measurements, and ground-penetrating radar measurements. All of these methods are potentially capable of detecting an underground cavity if the target is sufficiently large or sufficiently near the surface and each method has been used in certain specialized applications.

To characterize the general performance of these methods, if the cavity target is considered to be a spherical or cylindrical underground void, the detection limits may be expressed in terms of depth-to-diameter ratio at its threshold of detection. When the above-mentioned methods are applied in conventional ways, i.e., operated in a manner corresponding to their usual mineral and geologic exploration applications, test data indicate that these methods can detect cavities at depth limits ranging from about one to three diameters below the surface depending on the technique. The reasons for these detection limitations are somewhat related to the methods themselves, since they are based on different physical principles of operation and, in part, on the masking effects of the geologic structure and/or the surface conditions of the ground medium containing the cavity. This latter effect, generally called geologic noise, affects all of the methods. The superiority of any of the above-discussed detection techniques, based upon its physical method of operation, is less important than its ability to yield a detectable target response in the presence of geologic noise at the survey site.

Deep penetrating resistivity measurements are well known and widely used in borehole geophysics to obtain electrical resistivity logs in which the presence of the borehole fluid or fluid invasions into the drilled formation influence measurements of resistivity in the natural formation. Resistivity measurement techniques designed to provide deep penetration generally employ a multiplicity of electrodes or distributed line electrodes instead of point electrodes to provide a distributed current flow through a relatively large volume of the formation. This arrangement tends to average out the localized effects of geologic noise resulting in a more sensitive resistivity response from regions of the formation located further away from the electrode array. In practice, this process is commonly referred to as a focused resistivity measurement because of the deeper penetration distances achieved and because of the way in which the energized current source electrodes cause the distribution of the measuring current to be confined in the formation. In the common practice of borehole resistivity measurements and applications, the focusing technique causes the current to penetrate to greater radial distances away from the borehole. Focusing also tends to confine the spatial current distribution to a smaller volumetric zone so that the derived resistivity response pertains to a smaller region of the formation than that observed using non-focusing electrode arrays. This concept will become more clearly understood in later discussions in connection with methods used in the present invention to obtain synthetic representations of the current source electrode array.

The application of focusing concepts to surface survey operations introduces several practical problems which are not present in boreholes. First, the survey of underground targets requires the use of long discrete-point electrode arrays in order to achieve the desired depth of penetration. A second concern is that ground contact resistance is significant at surface electrodes, whereas contact resistance is generally negligible in boreholes. In addition to these physical difficulties, effective application of prior focused resistivity methods generally involves significant capital expenses for multiple injection electrode stations and for the increased electrical power required to energize these electrodes simultaneously. The synthetically focused resistivity technique of the present invention, discussed in greater detail below, overcomes these difficulties of the prior art by providing an efficient, cost-effective method for obtaining deep penetrating resistivity measurements which can provide a detectable target response in the presence of geologic noise at the survey site.

SUMMARY OF THE INVENTION

The present invention provides a method and apparatus for collecting measurements on the surface on the earth in a form which can be processed to obtain enhanced resolution of subsurface resistivity anomalies in the earth's geologic structure. The system of the preferred embodiment utilizes many separately acquired voltage and current measurements on the earth's surface in a suspension analysis to "synthesize" the condition whereby the many separate measurements are acquired simultaneously to give useful advantages in improved depth of investigation commonly known as focused resistivity measurements. The measurement system of the present invention offers an improved method for obtaining focused resistivity measurements which can be quickly and efficiently implemented for field operations. The time-sequenced measurement and mapping technique overcomes the difficulties in prior resistivity measurement systems by providing a system which provides target detection with a high degree of rejection of geologic noise and which can be implemented with a minimum of capital expense.

DETAILED DESCRIPTION OF THE PREFERRED EMBODIMENT

Figure 1:
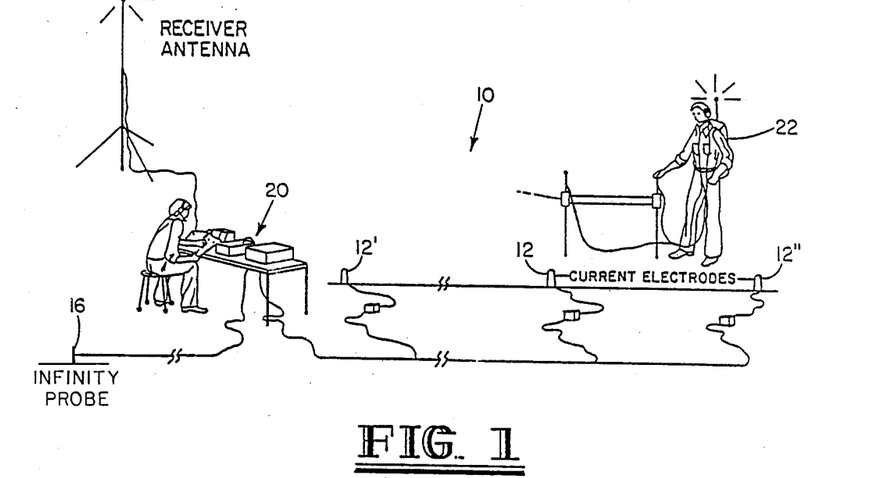
FIG. 1 is a schematic illustration of an automated earth resistivity measurement system used in the method of the present invention.
Figure 2:
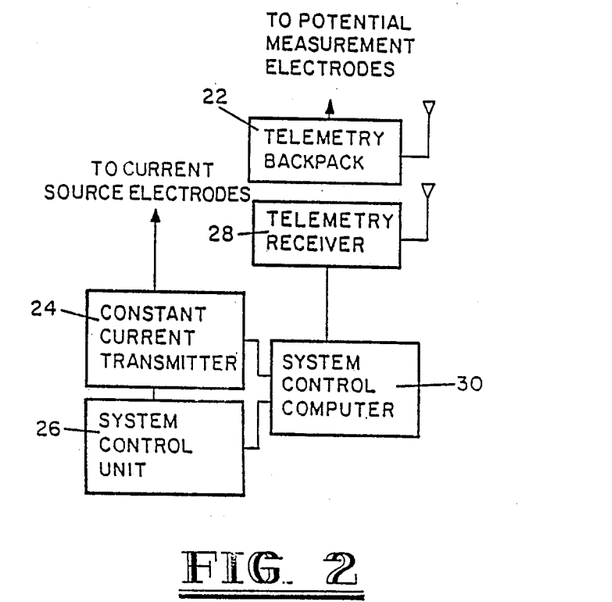
FIG. 2 is a schematic block diagram of the major system components of the automated earth resistivity measurement system used in the present invention.

The synthetically focused resistivity method and apparatus of the present invention is implemented by an automated resistivity measurement system 10 shown generally in the schematic illustrations of FIGS. 1 and 2. A general discussion of the techniques used to obtain resistivity measurements using an automated system such as that shown in FIGS. 1 and 2 is contained in the following references: Spiegel, R. J., Sturdivant, V. R. and Owen, T. E., "Modeling Resistivity Anomolies from Localized Voids Under Irregular Terrain," Geophysics, Vol 45, No. 7, (July, 1980); Peters, W. R. and Burdick, R. G., "Use of an Automatic Resistivity System for Detecting Abandoned Mine Workings," *Mining Engineering*, (January, 1983); and Owen, T. E., "Detection and Mapping of Tunnels and Caves," Developments in Geophysical Exploration Methods, Chapter 5, (1982). In addition, an automated geophysical exploration system using addressable current probes, such as those employed in the system of the present invention, is described in U.S. Pat. No. 4,467,283, issued to Owen, et al., which by this reference is incorporated for all purposes. Furthermore, a detailed discussion of the operation of the automated resistivity measurement system system of the present invention is contained in a report entitled "Focused Resistivity Method for Detecting Subsurface Coal Mine Workings," prepared by G. T. Darilek, et al. for the Bureau of Mines, U.S. Department of the Interior, Contract No. H0245005, (February, 1986), which by this reference is incorporated for all purposes.

Referring to FIG. 1, the automated resistivity measurment system 10 employs a pole-dipole electrode array in which a low frequency AC current is injected into the ground at a central first electrode 12 (the pole) and the resulting potential gradients are measured at two closely spaced electrodes 14 and 14' (the dipole). Second and third current injection electrodes 12' and 12" are located on each side of the first electrode 12 to implement the time-sequenced injection of AC current to achieve the focused resistivity characteristics described below. Additional current injection electrodes can be added to increase the focusing effects of the system. The current return electrode 16 is located far enough away from the injection electrodes to be effectively at an infinite distance away.

The injection of AC current by each of the respective injection electrodes 12, 12' and 12" is regulated by a plurality of current control modules 18 which are controlled by a central operating station 20 as described below. Data relating to the potential gradients measured by the electrodes 14 and 14' of the measurement dipole are transmitted to the central control station by either a wireline cable or by a UHF radio transceiver 22 worn by the remote site operator.

The major system components of the central control station 20 can be seen by referring to the schematic block diagram of FIG. 2. AC current for the current control modules 18 is provided by a constant current transmitter 24. The system control unit 26 automatically addresses the current control modules at each of the respective electrodes and automatically switches current from the constant current transmitter 24 into each electrode in the desired sequence. Potential gradient measurement data from the dipole probe are transmitted via the backpack transceiver 22 to the central telemetry transceiver 28. The data from the transceiver 28 is processed by the system control computer 30 using the synthetic focusing relationships described hereinbelow.

Figure 3:
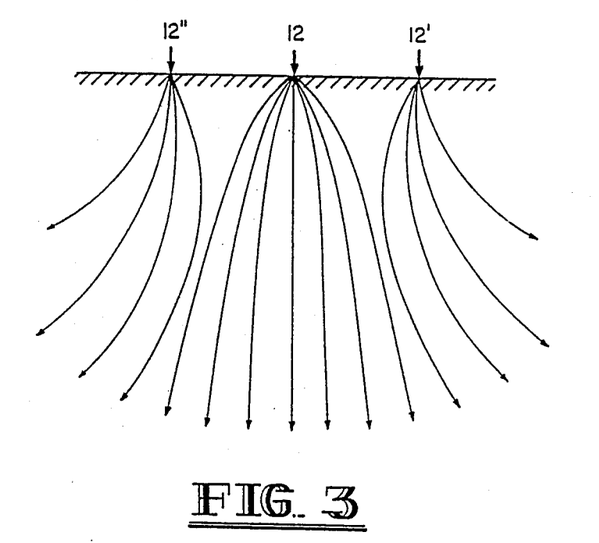
FIG. 3 is a graphic illustration of the current distribution produced by three simultaneous point sources of current injected into a half space.

The concept of focused current operation in connection with earth resistivity measurements applies to the spatial distribution of current within the geologic structure being probed. Conventional focused current operation is illustrated in FIG. 3, showing a three electrode arrangement laid out on a flat half-space. Equal currents of the same polarity are injected at the outer source electrodes 12' and 12" and returned to a fourth electrode located at infinity. The central current electrode 12, placed symmetrically between the outer electrodes 12' and 12", is also excited to inject a smaller current of the same polarity as that injected by the outer electrodes. The larger current flow from the outer electrodes 12' and 12" spatially constrains the zone of current flow from the central electrode in the plane of the three electrodes. Thus, the current flow lines associated with the central electrode 12 form a fan-shaped "focused" pattern oriented in a plane transverse to the electrode line layout. This central zone of current is defined as a sector-focus pattern and the in-line electrode arrangement shown in FIG. 3 is referred to as a line-focus array. The physical sector-focus effect occurs in this three-electrode example only when the three current injection electrodes are simultaneously energized.

Figure 4:
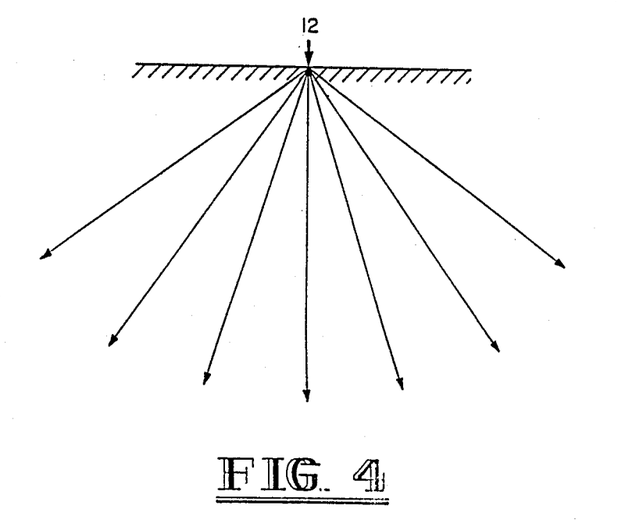
FIG. 4 is a graphic illustration of the current distribution produced by a single point source of current injected into a half space.

If the currents flowing in the outer electrodes 12' and 12" shown in FIG. 3 are turned off leaving only that flowing in the central electrode 12, the current will diverge radially (hemispherically) into a uniform conducting medium. This condition is illustrated in FIG. 4, representing conventional unfocused current injection by a single point source such as that associated with the standard automated resistivity measurement system pole-dipole earth resistivity array.

Figure 5:
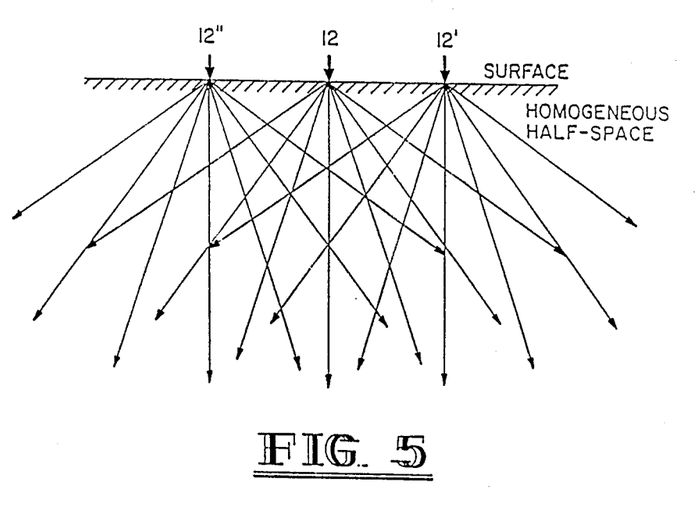
FIG. 5 is a graphic illustration of the current distribution produced by three superimposed point sources of current sequentially injected from three point sources in a half space.

If the currents to each of the three electrodes shown in FIG. 3 are turned on and off in time sequence so that the electrodes are not simultaneously energized, then the resulting current distribution patterns for the three-electrode sequence will have the form shown in FIG. 5. Even though these current patterns are drawn in an overlapping manner, they must be analytically (synthetically) superimposed to derive the effect of focusing. Therefore, if the three radially-divergent patterns shown in FIG. 5 are assumed to exist simultaneously, the law of linear superposition will cause the three separate spatial current flow fields to add together, as illustrated earlier in FIG. 6 to produce exactly the same composite current flow pattern as that illustrated earlier in FIG. 3. Thus, it can be seen that superposition of several independent time-sequenced current flow fields in the conducting medium can yield the same current distribution (focusing) effect as the simultaneous injection of those currents at the same electrodes used in the time-sequenced case.

This concept of equivalence of time-sequenced currents (and associated potential readings) with simultaneous currents (and associate composite potential readings) is particularly important with respect to the adaptation of the automatic resistivity measurement system 10 discussed above to focused current operation. That is, since the system operates in a time-sequenced manner, an advantageous approach to introducing focusing operation is to arrange the system to collect the current and potential measurements in such a manner as to be suitable for analytical superposition in the data analysis process.

Figure 6:
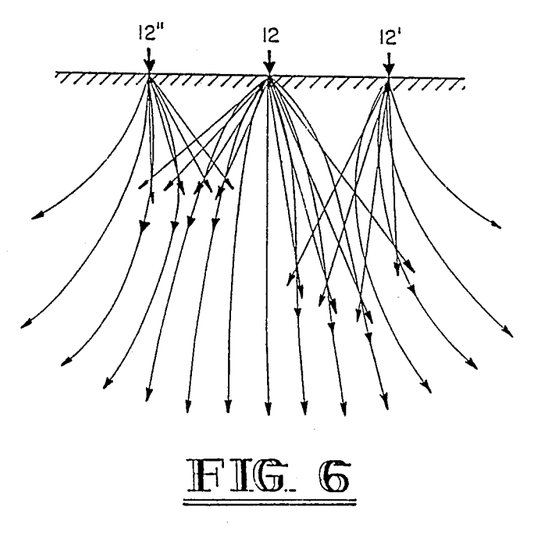
FIG. 6 is a graphic illustration of superimposed currents and their equivalent representation of simultaneous current injection from three point sources.

The sector-focused current pattern produced by the linear-electrode layout of FIG. 6 can be further constrained to produce a collimated-focus current pattern by using a two-dimensional array of surface injection electrodes. The collimated focus mode is characterized as a pencil-beam enhancement of the down-going current below an areal array of discrete point current electrodes and emanating from any current electrode within the central area of the array selected for focused analysis. In this case, the penetration depth and localization of the down-going current will obviously be greater than that of either the sector focused mode or of the non-focused mode of operation. This collimated areal survey technique can also be synthesized from elemental electrode array configurations operated in time sequence. The manner of data acquisition for this mode is still based on pole-dipole measurements. However, the measurements are obtained by laying out multiple parallel lines of electrodes and taking sequential measurements to synthesize the focusing effect of a two dimensional array of electrodes in which each of the electrodes is simultaneously energized. To synthesize the focusing characteristics of a two dimensional electrode array, a first set of electrodes is placed in the ground such that the electrodes are in a spaced linear pattern. The electrodes are then sequentially energized as described above and measurements are made to obtain data relating to the potential gradients created by the individual electrodes. The set of electrodes is then moved to a second position such that the electrodes form a second linear pattern which is parallel to the first linear pattern. The measurement process is repeated and the set of electrodes is again moved to subsequent positions until the survey area has been completely covered. As an alternative, the electrodes can be moved to a plurality of positions in a spiral pattern in the area to be surveyed. Focusing is achieved by numerically synthesizing the effects of simultaneous operation of all of the current electrodes in the various positions described above to create the effect of a two dimensional array of simultaneously activated electrodes.

Figure 7:
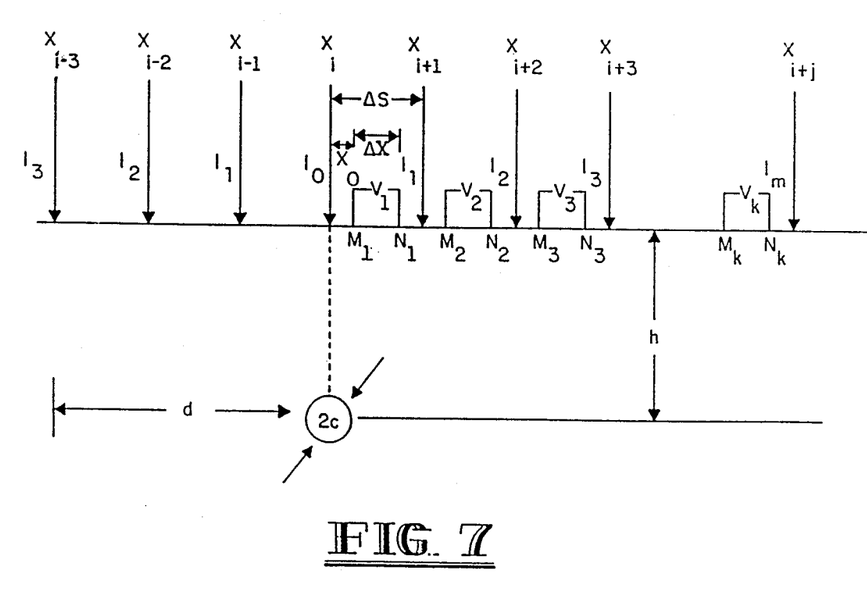
FIG. 7 is a graphical representation of a focused array and a cylindrical cavity of diameter $2c$ embedded in a conducting host medium of resistivity $\rho$.

FIG. 7 shows the specific details of the focused array geometry of multiple current electrodes that comprises part of the invention. This array geometry consists of $2m+1$ current electrodes along a linear survey line. The current injected by the central electrode is denoted as $I_0$ and the currents injected by the symmetrically disposed (external) electrode pairs are denoted as $I_2$, $I_3$, etc. Current focusing is achieved by maintaining (or synthetically adjusting) the external electrodes to be at the same potential.

To demonstrate the focused current mode of operation, the above electrode configuration may be implemented in the solution for a point source of current near an air-filled cavity embedded in a uniformly conducting host medium. Thus, the potential at the position $M_k$ is given by:

$$V_i(X_{Mk}) = (I_o \rho / 2\pi) \left\{ f(X_{Mk}, X_i) + \sum_{j=1}^{m} \frac{I_j}{I_o} [f(X_{Mk}, X_{i+j}) + f(X_{Mk}, X_{i-j})] \right\} \quad (1)$$

where the functions $f(X_{Mk}, X_i)$, $f(X_{Mk}, X_{i+j})$, and $f(X_{Mk}, X_{i-j})$ are dependent on the relative positions of the potential electrode at $M_k$ and the current electrodes at $X_{i+j}$ and $X_{i-j}$ for $J=1, 2, 3, \ldots, m$, as well as the depth and diameter of the cavity. For a cavity of cylindrical shape, the function, $f$, is given by:

$$f = \frac{1}{R} - \frac{2}{\pi} \int_0^\infty \sum_{l=0}^\infty \epsilon_l K_l(\lambda r_i) K_l(\lambda r_M) \frac{I_l(\lambda_c)}{K_l(\lambda_c)} \cos l(\phi_i - \phi_M) \cos \lambda (Z_M - Z_i) d\lambda \quad (2)$$

where $R = [r_i^2 + r_M^2 - 2 r_i r_M \cos(\phi_i - \phi_M)]^{\frac{1}{2}}$, $r_M = [h^2 + (X_M - d)^2]^{\frac{1}{2}}$, $r_i = [h^2 + d^2]^{\frac{1}{2}}$ $\phi_i = \tan^{-1} \frac{h}{X_i - d}$, and $$\phi_M = \tan^{-1}\frac{h}{X_M - d}.$$

In order to reduce the computations required for deep-penetration survey data, the air-earth interface effect in Eq. (2) is assumed to be negligible.

In the same manner, the potential at the position $N_k$ is obtained as:

$$V_i(X_{Nk}) = \frac{I_o\rho}{2\pi}\left\{f(X_{Nk},X_i) + \sum_{j=1}^{m}\frac{I_j}{I_o}[f(X_{Nk},X_{i+j}) + f(X_{Nk},X_{i-j})]\right\} \quad (3)$$

Focusing is achieved by maintaining the electrodes at the same potential, i.e.:

$$V_i(X_{Mk}) = V_i(X_{Nk}), \quad (4)$$

at the position given by $$X_{Mk} = X_i + X_o + \Delta S(k-1),$$

and $$X_{Nk} = X_{Mk} + \Delta X; \text{ for } k=1, 2, 3, \ldots, m.$$

where
 $X_i$ = the abscissa of the central current electrode;
 $X_o$ = distance from the central current electrode to the potential current electrode $X_{M1}$;
 $\Delta S$ = distance between the adjacent current electrodes in the focused array; and
 $\Delta X$ = distance between measurement potential electrodes.

Hence, the kth equations is given by:

$$\sum_{j=1}^{m}\frac{I_j}{I_o}[f(X_{Nk},X_{i+j}) + f(X_{Mk},X_{i-j}) - f(X_{Mk},X_{i+j})] = f(X_{Mk},X_i) - f(X_{Nk},X_i). \quad (5)$$

The m equations are of the general form:

$$b_{k1}a_1 + \ldots + b_{kj}a_j + \ldots + b_{km}a_m = a_k \quad (6)$$

where:

$$b_{K1}a_1 + \ldots + b_{kj}a_j + \ldots + b_{km}a_m = a_k \quad (6)$$
where:

$$a_j = \frac{I_j}{I_o};$$

$$b_{kj} = f(X_{Nk},X_{i+j}) + f(X_{Nk},X_{(i-j)}) - f(X_{Mk},X_{i+j}) - f(X_{Mk},X_{i-j});$$
and $$a_k = f(X_{Mk},X_i) - f(X_{Nk},X_i)$$

for:

k from 1 to m
j from 1 to m.

The solutions in determinant form are given by:

$$a_j = (Q_i/D), \quad (7)$$

where:

$$Q_j = \begin{vmatrix} b_{11} & b_{12} & \ldots & a_1 & \ldots & b_{1m} \\ \cdot & & & & & \\ \cdot & & & & & \\ \cdot & & & & & \\ b_{m1} & b_{m2} & \ldots & a_m & \ldots & b_{mm} \end{vmatrix}$$

and $$D = \begin{vmatrix} b_{11} & b_{12} & \ldots & b_{1j} & \ldots & b_{1m} \\ \cdot & & & & & \\ \cdot & & & & & \\ \cdot & & & & & \\ b_{m1} & b_{m2} & \ldots & b_{mj} & \ldots & b_{mm} \end{vmatrix}$$

Similarly, for a homogenous medium, $$(I_j/I_o)_n \equiv a_j = (Q_j)_n/(D)_n \quad (8)$$

where, now $$b_{kj} = \frac{1}{|X_{Nk} - X_{i+j}|} + \frac{1}{|X_{Nk} - X_{i-j}|} + \frac{1}{|X_{MR} - X_{i+j}|} - \frac{1}{|X_{Mk} - X_{i-j}|}, \text{ and}$$

$$a_k = \frac{1}{|X_{Mk} - X_i|} - \frac{1}{|X_{Nk} - X_i|}.$$

The apparent resistivity of the linear electrode arrangement becomes $$(\rho_a)_i = \frac{\rho\left(f(X_{M1},X_i) + \sum_{j=1}^{m}a_j[f(X_{M1},X_{i+j}) + f(X_{M1},X_{i-j})]\right)}{\frac{1}{|X_{M1} - X_i|} + \sum_{j=1}^{m}(a_j)_h\left(\frac{1}{|X_{M1} - X_{i+j}|} + \frac{1}{|X_{M1} - X_{i-j}|}\right)} \quad (9)$$

where i is the central current electrode position and j is the position of the adjacent current electrode of the focused array.

The potential and current fields for an air-filled cavity of radius c=1 m were calculated for the focused array shown in FIG. 7. In these numerical calculations, the unknown normalized currents, $a_j = (I_j/I_o)$ were determined by solving the system of equations given either by Eq. (6) of Eq. (7) at the surface of the earth Y=0. Subsequently, the potential fields were obtained using the expression:

$$V_i = \frac{I_o \rho}{2\pi} \left\{ f(X,Y;X_i) + \sum_{j=i}^{10} \alpha[f(X,Y;X_{i+j}) + f(X,Y;X_{i-j})] \right\}, \quad (10)$$

where (X,Y) are the coordinates for the subsurface potential fields and $X_i$, $X_{i+j}$, and $X_{i-j}$ for j=1, 2, ... 10 are the locations of the current electrodes of the focused array.

Figure 8:
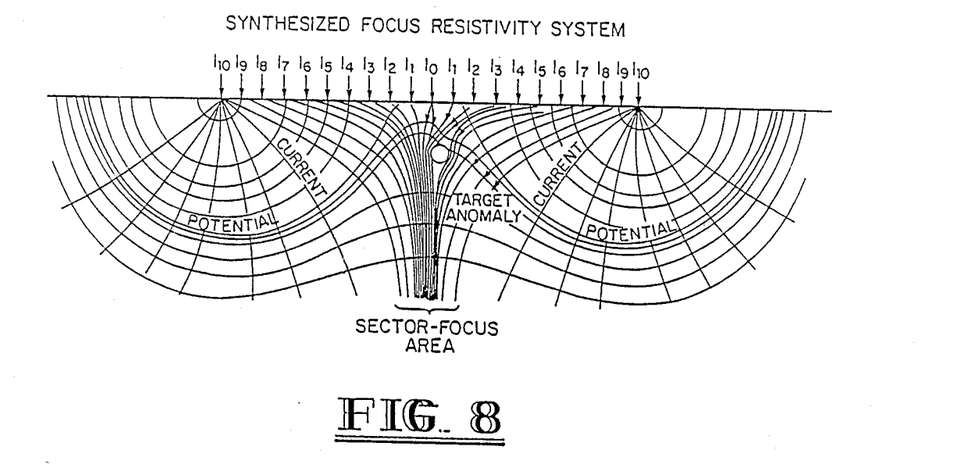
FIG. 8 is a graphical representation of a surface focused array showing the current and potential field releated to a hypothetical cavity detected using the method of the present invention.

FIG. 8 shows the focused current and potential fields for h=60 m with potential dipole pair spacings $M_1N_1 = M_2N_2 = \ldots = M_{10}N_{10} = 1$ meter. The total number of current electrodes was 2 m+1=21 and the separation between the electrodes was $\Delta S = 30$ m. The fields were calculated for $X_i = d$; that is, the central current electrode was located exactly above the center of the cavity. In this region, the focusing effect was obtained by forcing the current injected by the central current electrode and that originated from the adjacent current pairs to be perpendicular to the earth's surface.

In addition, potential field computations were carried out for cases using 3, 5, and 7 current electrodes. From such results and the previous calculations, the potential field lines become more parallel to the surface of the earth as the number of adjacent current electrode pairs increases. Thus, a very pronounced focusing of the current can be created.

Figure 9:
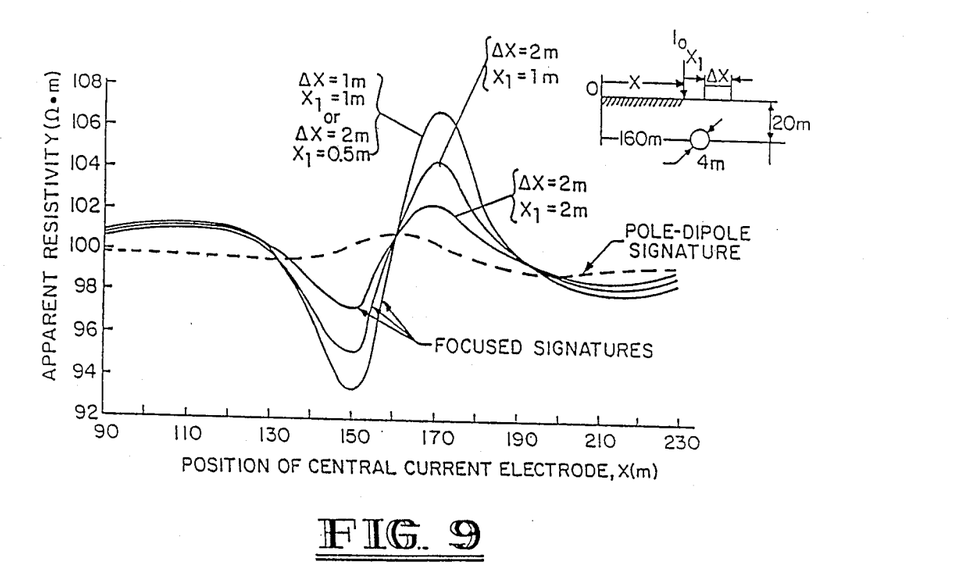
FIG. 9 is a graphical representation of the apparent resistivity cavity response versus central current electrode position.

The apparent resistivity spatial signature of a cavity target example is shown in FIG. 9, plotted as a function of the central current electrode position along the survey line. The peak-to-peak resistivity anomaly of the cavity is 1.11 percent, which is approximately 5.5 times greater than the corresponding pole-dipole anomaly measured without the focusing technique of the present invention.

Using data obtained by the automated resistivity measurement system described in the aforementioned references and the present disclosure, the mathematical relationships discussed above can be incorporated into a computer program for the system control computer 30 to convert pole-dipole measurements into synthetically-derived focused resistivity data which can be used to detect subsurface cavities. Anomalies in the geologic structure surveyed by the synthesized line-focused array or the two dimensional array are detected in both position along the respective survey line and in depth by comparing the experimental field data with mathematical model responses computed for localized cavity targets assumed to be in the current focused zone of measurement. When the modeled target is located at the transverse position and depth which results in an apparent resistivity response which maximizes the analytical cross correlation function computed for the experimental field measurements and the model-calculated data, that target location is the most probable location of the subsurface cavity target being sought. The degree of correlation between the two sets of data defines the match between the modeled target size and shape and the actual target or, otherwise, it indicates the degree of confidence that should be assigned to the target detection results.

While the focused resistivity method and apparatus of the present invention has been described in connection with the preferred embodiment, it is not intended to be limited to the specific form set forth herein, but on the contrary, it is intended to cover such alternatives, modifications, and equivalents as may be included within the spirit and scope of the invention as defined by the appended claims.

We claim:

1. A system for detecting the existence of subsurface anomalies, comprising:
    a plurality of means for coupling electric current into the earth;
    a plurality of addressable switching means, each of said switching means being connected to one of said plurality of means for coupling electric current, each of said switching means being responsive to a unique address signal to temporarily electrically activate its associated means for coupling electric current;
    means for providing a series of address signals to said switching means to sequentially activate each of said switching means to cause each said means for coupling current to inject a quantity of current into the earth in a predetermined sequence;
    means for measuring the resultant electric potential gradients produced by each of said means for coupling current and for producing a data set representation thereof;
    means for processing the data sets corresponding to each of said means for coupling current to obtain a synthetically-derived resistivity representation of an equivalent potential gradient produced by said plurality of means for coupling current being simultaneously energized; and
    means for correlating said synthetically-derived resistivity equivalent representation of said gradient with the location of a geologic anomaly.

2. A system according to claim 1, said means for coupling electric current comprising a plurality of electrodes in a spaced linear pattern.

3. A system according to claim 1, said means for coupling electric current comprising a plurality of electrodes in a spaced two dimensional array.

4. A method for detecting subsurface geologic anomalies, comprising the steps of:
    placing first, second, and third electrodes at the surface of the ground to be tested for the existence of anomalies;
    sequentially providing said first, second, and third electrodes with a quantity of electric current, said current creating a potential gradient in the ground near said electrodes;
    measuring the potential gradient at the surface in the vicinity of the each of said electrodes during the time each said electrode is provided with electric current, thereby obtaining first, second, third data sets corresponding to the potential gradients produced by said electrodes; and
    processing said first, second, and third data sets to obtain a synthetically-derived resistivity equivalent representation of the potential gradient produced by three electrodes simultaneously provided with said quantity of electric current; and
    correlating said synthetically-derived resistivity equivalent representation of potential with the location of an anomaly in said ground.

5. The method according to claim 4, said first, second and third electrodes being in a spaced linear pattern.

6. A method for detecting subsurface geologic anomalies, comprising the steps of:
    placing a set of electrodes at a first position at the surface of the ground to be tested for the existence of anomalies, said electrodes being in a spaced linear pattern;

sequentially providing each of said electrodes in said set with a quantity of electric current, said current creating a potential gradient in the ground near each of said electrodes;

measuring the potential gradient at the surface in the vicinity of the each of said electrodes during the time each said electrode is provided with electric current, thereby obtaining data sets corresponding to the potential gradients produced by each of said electrodes;

moving said set of electrodes to a second position at the surface of the ground to be tested, said electrodes being in a spaced linear pattern parallel to said first spaced pattern;

sequentially providing each of said electrodes in said set with a quantity of electric current, said current creating a potential gradient in the ground near each of said electrodes;

repeating said steps of moving said set of electrodes, sequentially activating said electrodes and measuring said potentials until the ground to be tested has been completely surveyed; and processing said data sets obtained at each position to produce a synthetically-derived resistivity equivalent representation of the potential gradient produced by a two dimensional array of electrodes simultaneously provided with said quantity of electric current; and correlating said synthetically-derived resistivity equivalent representation of potential with the location of an anomaly in said ground.

* * * * *